United States Patent
Osborn et al.

(10) Patent No.: US 9,021,276 B2
(45) Date of Patent: Apr. 28, 2015

(54) VOLTAGE ADJUSTMENT BASED ON LOAD LINE AND POWER ESTIMATES

(75) Inventors: Michael J. Osborn, Hollis, NH (US); Sebastien Nussbaum, Lexington, MA (US); John P. Petry, San Diego, CA (US); Umair B. Cheema, Richmond Hill, CA (US)

(73) Assignee: ATI Technologies ULC, Markham, Ontario (CA)

( * ) Notice: Subject to any disclaimer, the term of this patent is extended or adjusted under 35 U.S.C. 154(b) by 254 days.

(21) Appl. No.: 13/465,680

(22) Filed: May 7, 2012

(65) Prior Publication Data

US 2013/0297950 A1 Nov. 7, 2013

(51) Int. Cl.
| | |
|---|---|
| G06F 1/00 | (2006.01) |
| G01R 19/00 | (2006.01) |
| G01K 17/00 | (2006.01) |
| G05F 5/00 | (2006.01) |
| G06F 1/26 | (2006.01) |
| G06F 1/32 | (2006.01) |

(52) U.S. Cl.
CPC ............... *G06F 1/26* (2013.01); *G06F 1/3203* (2013.01)

(58) Field of Classification Search
CPC .................................. G06F 1/26; G06F 1/3203
USPC ............... 713/300; 702/64, 136; 323/299
See application file for complete search history.

(56) References Cited

U.S. PATENT DOCUMENTS

| | | | | |
|---|---|---|---|---|
| 5,440,520 | A * | 8/1995 | Schutz et al. | 365/226 |
| 6,425,086 | B1 * | 7/2002 | Clark et al. | 713/322 |
| 6,472,899 | B2 * | 10/2002 | Osburn et al. | 702/64 |
| 7,039,817 | B2 * | 5/2006 | Burnham et al. | 713/320 |
| 7,366,928 | B2 * | 4/2008 | Park | 713/310 |
| 7,900,069 | B2 * | 3/2011 | Allarey | 713/320 |
| 8,051,310 | B2 * | 11/2011 | He et al. | 713/320 |
| 8,601,292 | B2 * | 12/2013 | Lam et al. | 713/310 |
| 2006/0248359 | A1 * | 11/2006 | Fung | 713/300 |
| 2009/0230769 | A1 * | 9/2009 | Aerts | 307/32 |
| 2010/0162008 | A1 * | 6/2010 | Nakashima et al. | 713/300 |
| 2012/0166835 | A1 * | 6/2012 | Boss et al. | 713/320 |
| 2013/0024713 | A1 * | 1/2013 | Bajic et al. | 713/340 |

* cited by examiner

*Primary Examiner* — Stefan Stoynov
(74) *Attorney, Agent, or Firm* — Faegre Baker Daniels LLP

(57) ABSTRACT

A method and device for setting a processor performance profile for a processor that is unable to directly measure voltage supplied by a voltage regulator includes determining a voltage requested of the voltage regulator and determining a first characteristic of a first portion of the electrical component. The first characteristic is one of power consumed by the first portion of the electrical component and load presented by the first portion of the electrical component. A first current is then determined by using the first voltage, the first characteristic, and a known relationship therebetween. A third voltage that is an estimate of the voltage supplied by the voltage regulator is then determined by comparing the first current to load line characteristics of the electrical component. The third voltage is then used to manage performance of the processor.

23 Claims, 3 Drawing Sheets

VOLTAGE ADJUSTMENT BASED ON LOAD LINE AND POWER ESTIMATES

FIELD OF THE DISCLOSURE

The present disclosure is related to automated methods and devices for dynamically determining more accurate heat and/or power related values for driving processor performance.

BACKGROUND

In processors, such as a Central processing unit (CPU), Graphics Processing Unit (GPU), or otherwise, performance is largely a function of, and measured by, how many operations can be performed over a set time period. Many factors contribute to the performance that can be garnered from a processor. One such factor is the heat produced by the processor and the ability to dissipate that heat. Production of more heat than can be adequately dissipated leads to unreliability and processing faults within the processor. As a result, designs must operate at a performance point that allows for temperature margin, often at the cost of performance. Accordingly, efforts to increase the accuracy of the measured or calculated temperature will allow for a decreased temperature margin and thus enable and result in increased performance.

Heat within a processor is at least partially dependent upon the voltage, current, and power supplied to a processor or block of a processor. In some situations, the precise values of supplied voltage cannot be measured or such measurement imparts logistical hurdles that make such measurement impractical. One such situation is when voltage is supplied to a processor from an off-chip voltage regulator that does not provide a mechanism to dynamically monitor the voltage, which may vary based on load and/or load-lines implemented by the regulator. While the chip requested voltage is used to make calculations on the heat being produced by the processor and to make other calculations affecting performance, the requested voltage may differ from that being supplied by the voltage regulator.

To ensure stability of the processor and to make sure that the processor doesn't overheat, in the absence of being able to accurately measure the supplied voltage, such calculations must assume that the supplied voltage is the maximum voltage that the voltage regulator can supply for a given voltage request (a voltage worst case scenario). From a heat perspective, the worst case scenario voltage represents a worst case scenario heat value. When less than the worst case scenario voltage is being supplied, there is heat dissipation allocated to that operation that is not needed or utilized because the operations of the processor continue to assume that maximum voltage is being supplied. The extra allocated heat dissipation could otherwise be allocated to additional blocks and additional processor functions could be powered using the wasted allocation.

Additionally, when a voltage regulator is employed, the processor sends requests to the voltage regulator requesting supply of a given voltage. The requested value is then used to calculate/estimate the current and power being consumed by the processor (or sub-part of the processor). The current and power estimations and requested voltage are then used in a power/performance algorithm that is responsible for setting frequency and/or voltage parameters for the design.

Differences between the requested voltage and the voltage actually delivered provide inaccuracies in the estimates. Accordingly, the algorithms (or other operations that use the algorithm output) must build in tolerances that assume a worst case inaccuracy in the algorithm output. Again, such requirements to build in worst case tolerances result in inefficiencies that could be reduced through having more accurate information.

Accordingly, what is needed is a way to more accurately estimate the voltage actually being used and to be able to use those estimates to more fully utilize the processing power of processors.

DETAILED DESCRIPTION

Figure 1:
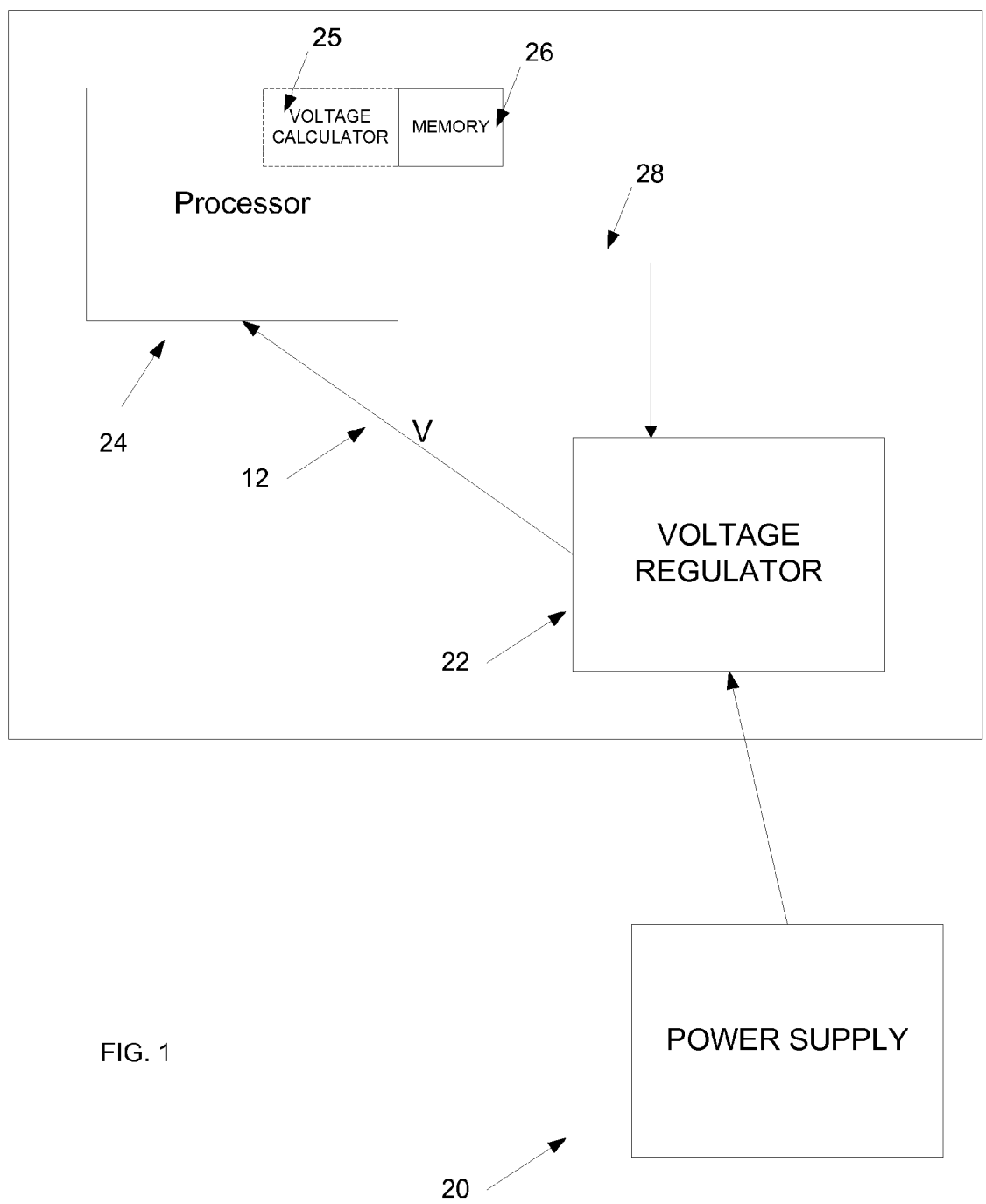
FIG. 1 is a system able to employ a method of more accurately estimating supplied voltage.

Briefly, in one example, a circuit is provided including an electrical component configured to handle at least one processing block; a voltage control module controlling a voltage supplied to the at least one electrical component; the voltage control module receiving a request for a first voltage to be supplied to the electrical component, the voltage control module supplying a second voltage to the electrical component, the second voltage being unknown to the electrical component; and a memory. The memory stores a plurality of instructions that when interpreted cause the electrical component to: determine a first characteristic of the electrical component, the first characteristic being selected from the group consisting of power consumed by the electrical component and load presented by the electrical component; determine a first current by using the first voltage and the first characteristic; and determine a third voltage by comparing the first current to load line characteristics of the electrical component, the third voltage being an approximation of the second voltage.

In another example, a method of setting a processor performance profile for a processor that is unable to directly measure voltage supplied by a voltage regulator is provided. The method includes determining a first voltage requested of the voltage regulator by the processor; determining a first characteristic of a first portion of the electrical component, the first characteristic being selected from the group consisting of power consumed by the first portion of the electrical component and load presented by the first portion of the electrical component; determining a first current by using the first voltage and the first characteristic and a known relationship between the first voltage, first characteristic, and the first current; determining a third voltage by comparing the first current to load line characteristics of the electrical component; and using the third voltage to manage performance of the processor such that stored instructions that make up the performance profile of the processor incorporate at least one of the third voltage and a voltage that is derivative of the third voltage.

In yet another example, a method of controlling circuit voltage is provided including requesting, by a processor, a first voltage to be supplied thereto by a voltage regulator; receiving a second voltage from the voltage regulator where the second voltage cannot be directly measured by the processor; measuring a first characteristic of the processor, the first characteristic being selected from the group consisting of power consumed by the processor and load presented by processor; calculating a first current expected to result from a system having the first characteristic and being supplied with the first voltage; comparing the first current to a load line algorithm to calculate a third voltage; and storing instructions in memory accessible to the processor, the instructions directing operation of the processor, the instructions being at least partially based on the third voltage.

Among other advantages, for example, the method and device provide for increased performance. The increased performance are achieved without subjecting the processor to increased instability or dangers of faults by obtaining a more accurate picture of what is actually being experienced by the processor.

Turning now to the drawings wherein like numerals represent like components, FIG. 1 shows a computing system utilizing a power supply 20 that powers voltage regulator 22. Voltage regulator 22, in turn, provides load line voltage 12 to processor 24. Memory 26 is also provided and may be integral or separate from processor 24. In addition to the circuits providing load line 12, communication circuit 28 is provided for communication between processor 24 and voltage regulator 22. Voltage calculator 25 is shown within processor 24. It should be appreciated that voltage calculator 25 may take the form of instructions stored within memory 26, designed into processor 24, or instantiated in processor 24.

Processor 24 is able to allocate some or all of its processing power to various processing blocks, or tasks. The processing power of processor 24 can be dedicated to a single block, or split over multiple blocks. Still further, certain blocks may not be able to take advantage of the full processing capacity of processor 24 such that processor 24 can fully accommodate more than one block when each block is operating at its peak. Processor 24 receives requests for processing allocations for blocks and then allocates processing capacity to the allocation requests.

Power supply 20 provides power to voltage regulator 22. Voltage regulator 22 provides a desired DC voltage to processor 24. Processor 24 is in communication with voltage regulator 22. Memory 26 stores information indicating which blocks are requesting a processing allocation. Memory 26 further stores information regarding which blocks are currently receiving a processing allocation (thereby utilizing a portion of the supplied voltage). Additionally, memory 26 stores parameters of processing requirements that various blocks require. These parameters include voltage requirements, current requirements, power requirements, time requirements.

Processor 24 selectively activates and deactivates processing blocks. Such activation and deactivation results in processor 24 calling for different voltages to be supplied from voltage regulator 22, and optionally its load-line implementation. The voltages called for are designed to achieve high performance of the processor without endangering stable processing by the processor.

A VID code transmitted by processor 24 to voltage regulator 22 determines a reference output voltage (the requested voltage, Vcc) (110). However, the resultant voltage from voltage regulator 22 varies from the dynamically requested voltage based on the current sampled by voltage regulator 22. (115)

Figure 2:
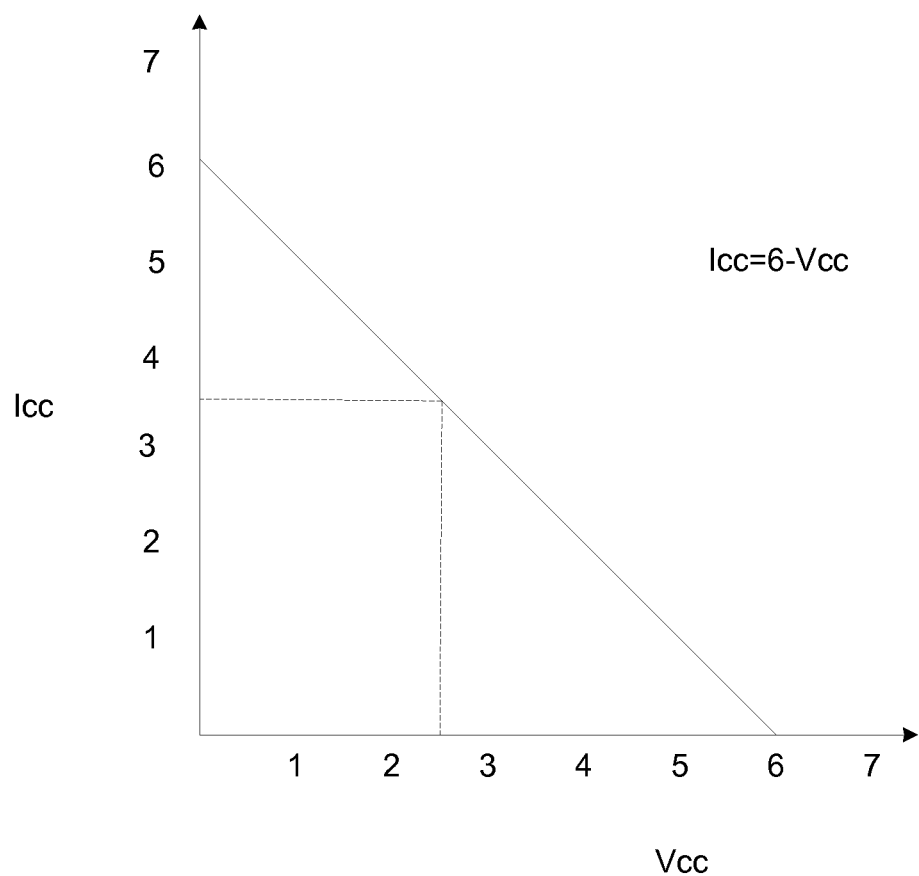
FIG. 2 is a graph providing a visual representation of a load line experienced by the system of FIG. 1.
Figure 3:
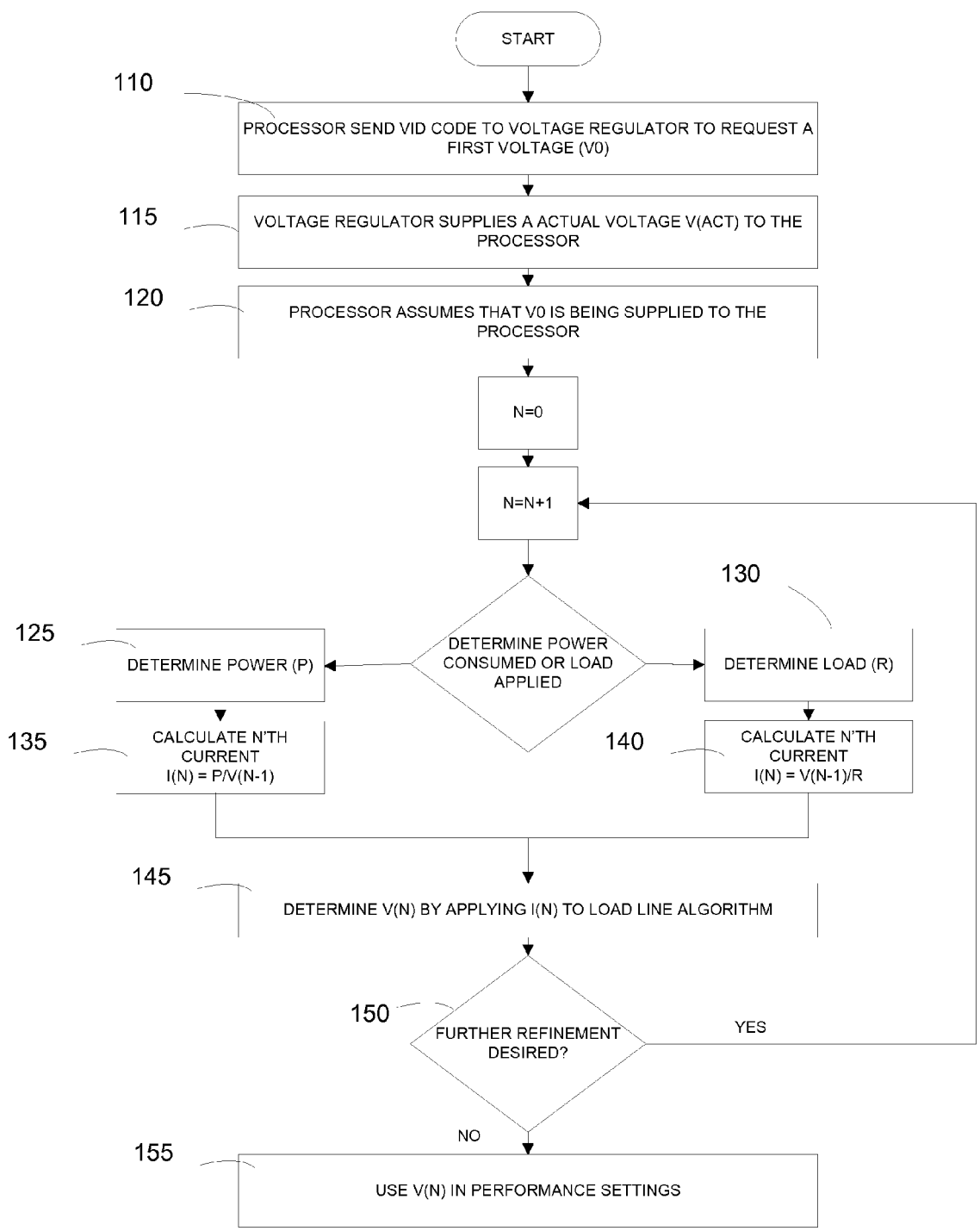
FIG. 3 is a flowchart showing the process employed by the system of FIG. 1.

As shown graphically in FIG. 2, a load line algorithm 200 defines the relationship between Vcc and Icc (illustratively Icc=6−Vcc). Accordingly, for any given measured Icc, a corresponding Vcc can be ascertained. For circuits where the Vcc cannot be measured, a measured or calculated Icc can be cross referenced with the load line algorithm (also referred to as a slope) to get the corresponding Vcc.

Knowledge of the actual resultant voltage (vs. the requested voltage identified by the VID code) provides a more accurate picture of the actual workings of the processor. Accordingly, an iterative process is employed to allow the actual voltage to be more accurately determined/estimated with each iterative pass.

It should be appreciated that the iterative process of voltage calculator 25 described below can be one done on the fly during application, or can be done ahead of time, to provide a more accurate values that can be stored in a look-up table or otherwise for later reference. Furthermore, the described process can be implemented via on-chip instructions, via a microcontroller, via firmware, via software and a controller, or any other combination of hardware and code that is apparent to one of skill in the art.

Initially, a first estimation of the applied voltage is obtained (V0). In the first iteration, the voltage called for via the VID code (120) is assumed to be the voltage that is actually being experienced by the processor (or sub-block of the processor). A calculated or measured power (125) or load (130) for the processor (or sub-block of the processor) is then determined. This determination may be made, for example, via monitors that measure the activity of a block and calculate power based on that activity or alternatively by assigning static power numbers to the blocks and providing look-up tables based on the state of the block.

If power is being used as the measured quantity, the power used by the processor (or sub-block of the processor) is determined (P). The current is determined by solving I=P/V. (135)

If load is being used as the measured quantity, the load applied by the processor (or sub-block of the processor) is determined (R). The current is then determined by solving I=V/R. (140)

Regardless of the measured quantity used, the resulting current value is then applied to the load line graph (FIG. 2) to determine the voltage that is associated with the determined current (145). This determined voltage is the second voltage (V2) which is closer to the actually applied voltage than V1.

At this point, if further refinement is desired (150), the process continues in its iterations, with successive currents being determined I2=P/V2, and the resulting currents being applied to the load line algorithm/slope to generate successive voltages (V3, V4, V5, etc.). Each successive voltage result is more accurate than the last.

Once more accurate voltages and currents are determined, these values can be used when processor 22 or processor blocks are active to be able to better tune the performance thereof (155). By way of example, knowing that a processor block actually runs at 0.8V instead of the peak voltage of 1.2V allows the processor to run at a higher frequency for a longer amount of time before having to drop down to a lower frequency to produce less heat.

Overall, the refined numbers provide increased accuracy. These numbers are fed into a power/performance algorithm that is responsible for setting frequency and/or voltage parameters for a given design. The refined numbers provide information points, such as voltage points, so that the power/performance algorithms need not rely on 1) the less accurate VID voltage or 2) a worst case scenario voltage that could result from the VID voltage.

Additionally, the relationship between requested and received voltage from voltage regulator 24 can be quantified. An increase in accuracy in understanding the relationship between the requested and received voltage can allow processor 22 to more accurately know what voltage to request to achieve a desired voltage received.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein.

The software operations described herein can be implemented in hardware such as discrete logic fixed function circuits including but not limited to state machines, field programmable gate arrays, application specific circuits or other suitable hardware. The hardware may be represented in executable code stored in non-transitory memory such as RAM, ROM or other suitable memory in hardware descriptor languages such as but not limited to RTL and VHDL or any other suitable format. The executable code when executed may cause an integrated fabrication system to fabricate an IC with the operations described herein Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic, software, and circuits described herein may also be produced as integrated circuits by such systems using the computer readable medium with instructions stored therein. For example, an integrated circuit with the aforedescribed software, logic, and structure may be created using such integrated circuit fabrication systems. In such a system, the computer readable medium stores instructions executable by one or more integrated circuit design systems that causes the one or more integrated circuit design systems to produce an integrated circuit. The integrated circuit includes logic operative to determine whether a page fault or subpage fault has occurred to effect an address translation and if a subpage fault has occurred, load a subpage corresponding to the fault from NVS to DRAM and if a page fault has occurred, load a page corresponding to the fault from NVS to DRAM.

What is claimed is:

1. A circuit comprising:
    an electrical component configured to:
        manage at least one processing block,
        transmit a request for a first voltage to be supplied to the electrical component,
        receive a second voltage responsive to the request for the first voltage, said second voltage different from said first voltage and said second voltage being unknown to the electrical component, and
        subsequent to transmitting the request for the first voltage, approximate the second voltage based upon the first voltage and a first characteristic of the electrical component, wherein the first characteristic is selected from the group consisting of power consumed by the electrical component and load presented by the electrical component.

2. The circuit of claim 1, further including a memory, the memory storing a plurality of instructions that when interpreted cause the electrical component to approximate the second voltage.

3. The circuit of claim 2, wherein the instructions further cause the electrical component to:
    determine a first current by using the first voltage and the first characteristic; and
    determine a third voltage by comparing the first current to load line characteristics of the electrical component, the third voltage being an approximation of the second voltage.

4. The circuit of claim 3, wherein the third voltage is closer to the second voltage than the first voltage is to the second voltage.

5. The circuit of claim 3, wherein the third voltage is used by the electrical component to determine design parameters for the electrical component.

6. The circuit of claim 3, wherein the plurality of instructions further cause the processor to determine a second current necessary to produce the power being consumed by the electrical component at the third voltage.

7. The circuit of claim 1, wherein the first voltage is a voltage requested by the electrical component to power a first portion of the electrical component.

8. The circuit of claim 7, wherein the electrical component is a processor.

9. The circuit of claim 1, wherein the first characteristic is load presented by the electrical component and the load is determined by consulting a look-up table.

10. The circuit of claim 1, further including a voltage control module controlling a voltage supplied to the electrical component; the voltage control module receiving a request for the first voltage to be supplied to the electrical component, the voltage control module supplying the second voltage to the electrical component.

11. A method of setting a processor performance profile for a processor that is unable to directly measure a second voltage supplied by a voltage regulator comprising:
    using a third voltage as an estimation of an expected value of the second voltage to manage performance of the processor whereby stored instructions that comprise the performance profile of the processor incorporate at least one of the third voltage and a voltage that is a derivative of the third voltage, wherein said third voltage is based upon: a first voltage requested of a voltage regulator by the processor, a first characteristic of a first portion of the processor wherein said first characteristic is one selected from the group consisting of power consumed by the first portion, load presented by the first portion, a known relationship between said first voltage, said first characteristic, and current, and load line characteristics of the processor.

12. The method of claim 11, wherein the first portion of the processor is the entire processor.

13. The method of claim 11, further including storing the first voltage and the third voltage such that the performance profile settings of the processor associate a request for the first voltage with production of the third voltage.

14. The method of claim 11, wherein the second voltage is associated with a first current and the voltage that is derivative of the third voltage is determined by determining a second current by using the third voltage and the first characteristic and a known relationship between the third voltage, first characteristic, and the second current and by comparing the second current to load line characteristics of the processor.

15. The method of claim 11, further including storing at least one of the third voltage and the voltage that is derivative of the third voltage in a look-up table that is accessible by the processor.

16. A method of controlling circuit voltage comprising:
    requesting, by a processor, a first voltage to be supplied thereto by a voltage regulator;

receiving a second voltage from the voltage regulator where the second voltage cannot be directly measured by the processor;

measuring a first characteristic of the processor, the first characteristic being selected from the group consisting of power consumed by the processor and load presented by processor;

calculating a first current expected to result from a system having the first characteristic and being supplied with the first voltage;

comparing the first current to a load line algorithm to calculate a third voltage; and storing instructions in memory accessible to the processor, the instructions directing operation of the processor, the instructions being at least partially based on the third voltage.

17. The method of claim 16, wherein the first voltage is a voltage requested by the processor to power a first processor block.

18. The method of claim 16, wherein the third voltage is closer to the second voltage than the first voltage is to the second voltage.

19. The method of claim 16, wherein the first characteristic is determined by consulting a look-up table, the look-up table being populated by storing the output of previously conducted measuring of the first characteristic.

20. The method of claim 16, wherein the third voltage is used in an iterative process that outputs additional voltages, each iteration of the process producing a voltage that is closer to the second voltage than the voltage of the previous iteration is to the second voltage.

21. A non-transitory computer readable medium containing instructions thereon, that when interpreted by at least one processor cause the at least one processor to:

request, a first voltage to be supplied thereto by a voltage regulator;

receive a second voltage from the voltage regulator where the second voltage cannot be directly measured by the processor;

measure a first characteristic of the processor, the first characteristic being selected from the group consisting of power consumed by the processor and load presented by processor;

calculate a first current expected to result from a system having the first characteristic and being supplied with the first voltage;

compare the first current to a load line algorithm to calculate a third voltage; and storing instructions in memory accessible to the processor, the instructions directing operation of the processor, the instructions being at least partially based on the third voltage.

22. The computer readable medium of claim 21, wherein the instructions are embodied in hardware description language suitable for one or more of describing, designing, organizing, fabricating, or verifying hardware.

23. The computer readable medium of claim 21, wherein the third voltage provides a more accurate approximation of the second voltage than the first voltage does.

\* \* \* \* \*